UNITED STATES PATENT OFFICE.

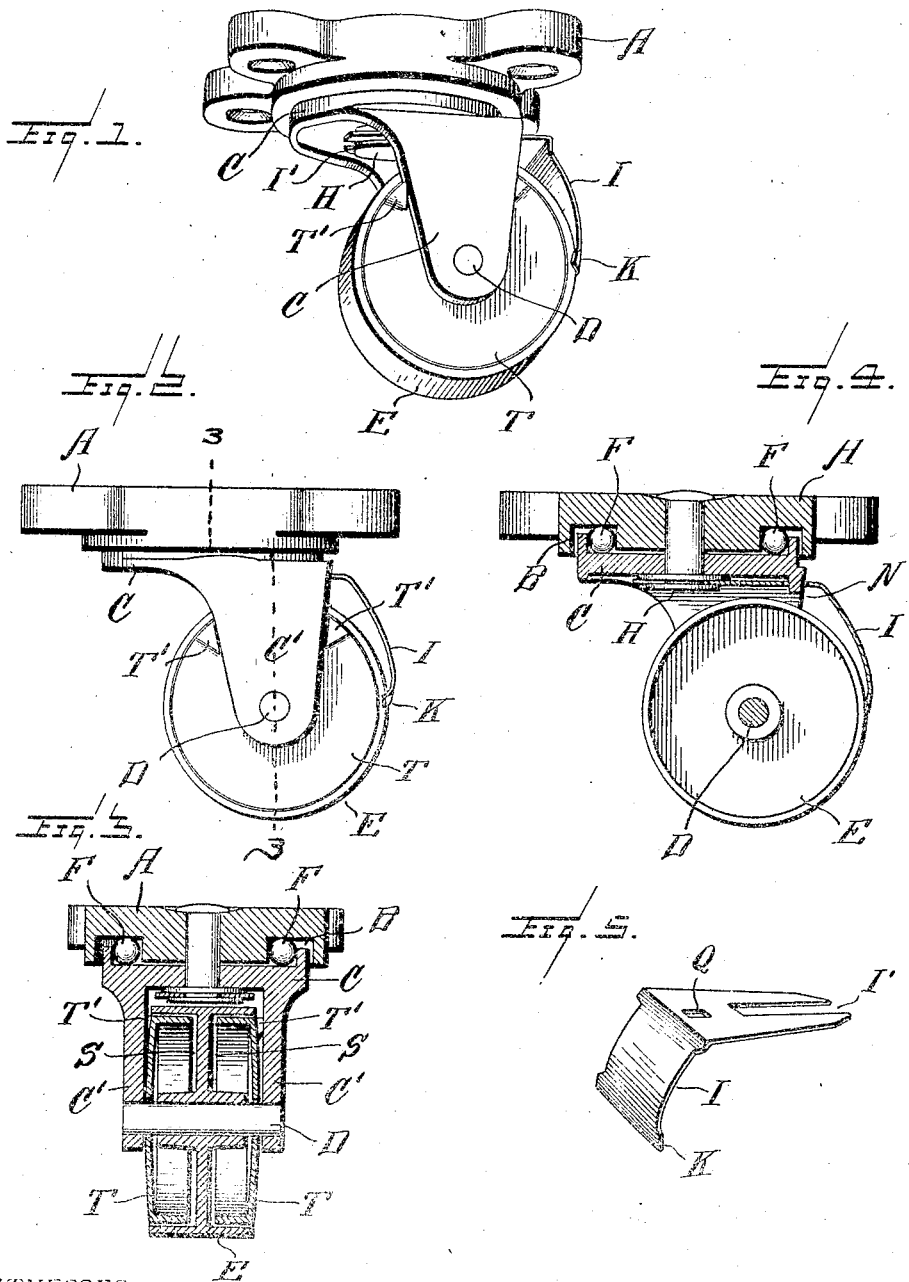

GEORGE M. WILLIAMS AND GROVER C. GREENO, OF COLUMBUS, OHIO.

CASTER-WHEEL.

951,553.   Specification of Letters Patent.   Patented Mar. 8, 1910.

Application filed December 23, 1909. Serial No. 534,689.

*To all whom it may concern:*

Be it known that we, GEORGE M. WILLIAMS and GROVER C. GREENO, citizens of the United States, residing at Columbus, in the county of Franklin and State of Ohio, have invented certain new and useful Improvements in Caster-Wheels; and we do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in caster wheels adapted to have ball bearings and so constructed as to prevent strings winding about the spindle of the caster.

The invention comprises various details of construction, combinations and arrangements of parts which will be hereinafter fully described and then specifically defined in the appended claims.

We illustrate our invention in the accompanying drawings, in which:—

Figure 1 is a perspective view of the caster made in accordance with our invention. Fig. 2 is a side elevation. Fig. 3 is a cross sectional view on line 3—3 of Fig. 2. Fig. 4 is a sectional view at right angles to Fig. 3 through the spindle of the caster, and Fig. 5 is an enlarged detail view of the fender.

Reference now being had to the details of the drawings by letter, A designates a plate adapted to be attached to any object to which it is desired to apply the caster and is provided with an annular recess B upon its outer face.

C designates a bracket member having arms C' therein which carry a pin D upon which the caster wheel E is journaled. Said bracket member has a disk-shaped base portion of such a diameter as to engage said recess, and ball bearings F are interposed between the inner face of said base portion of the bracket member and the bottom of the recess. A swivel pin is fixed to the central portion of the bottom of the recess and extends through the disk-shaped part of the bracket member and is adapted to hold the two parts together.

One end of the swivel pin has a flange H, and I designates a fender or guard having a slotted end I' adapted to straddle the swivel pin and engage intermediate the flange at the end of the pin and a fixed collar thereon, while the outer free end of the fender has laterally projecting portions K adapted to engage over the marginal edges of the caster wheel. A lug N projects from the outer face of the base portion of the bracket member and is adapted to engage an aperture Q formed in said fender to hold the latter in place.

It will be noted that the caster wheel has its opposite face recessed at S and a flanged disk T, centrally apertured, is adapted to fit within each of said recesses and the outer faces of said flanged disks are flush with the outer marginal edges of the caster wheel. Lugs T' project from the outer face of each flanged disk and spaced apart and adapted to engage on each side of the arms of the bracket member to prevent said flanged disk from rotation with the caster wheel.

From the foregoing, it will be noted that, by the provision of a ball bearing caster wheel made in accordance with our invention, a simple and efficient device is afforded whereby a string will be prevented from being caught and wound about the wheel or the spindle thereof by the provision of the fender and the stationary disks held one upon each side of the caster wheel.

What we claim to be new is:—

1. A caster wheel and guard comprising a recessed plate, a bracket member swiveled in said recess, ball bearings intermediate said base and member, a caster wheel journaled upon the arms of said member, a fender having a slotted end straddling the swivel connecting said base and member and having its free end positioned adjacent to the circumference of the wheel, and means for holding the fender upon said member.

2. A caster wheel and guard comprising a recessed plate, a bracket member swiveled in said recess, ball bearings intermediate said base and member, a caster wheel journaled upon the arms of said member, a fender having a slotted end straddling the swivel connecting said base and member and having its free end positioned adjacent to the circumference of the wheel, a lug projecting from the outer face of said member and adapted to engage a hole in the fender to hold the same in place.

3. A caster wheel and guard comprising a recessed plate, a bracket member swiveled in said recess, ball bearings intermediate said base and member, a caster wheel journaled upon the arms of said member, the opposite faces of said wheel being recessed, flanged apertured disks one of which is mounted in each of said recesses of the wheel, each of said disks having lugs spaced apart and adapted to engage each side of the arms of said member to hold the disks from rotation, and a fender mounted upon said member and having its free end adjacent to the circumference of the wheel.

In testimony whereof we hereunto affix our signatures in the presence of two witnesses.

GEORGE M. WILLIAMS.
GROVER C. GREENO.

Witnesses:
  DAISY D. PERKINS,
  JAMES E. McKENNEY.